United States Patent [19]

Ibbott

[11] 4,235,209
[45] Nov. 25, 1980

[54] DEVICE FOR INTRODUCING ADDITIONAL AIR INTO INTAKE PASSAGE LEADING TO COMBUSTION CHAMBER

[76] Inventor: Jack K. Ibbott, 4-17-7 Nishi Azabu, Minato-ku, Tokyo, Japan

[21] Appl. No.: 911,941

[22] Filed: Jun. 2, 1978

[51] Int. Cl.³ .......................................... F02M 73/04
[52] U.S. Cl. .................................... 173/585; 123/586
[58] Field of Search ....... 123/124 R, 119 D, 119 DB, 123/141, 119 CG

[56] References Cited

U.S. PATENT DOCUMENTS

| 2,326,598 | 8/1943 | Acosta | 123/124 R |
|---|---|---|---|
| 3,659,575 | 2/1972 | Lokka | 123/124 R |
| 3,799,301 | 3/1972 | Bentley | 123/124 R |
| 3,834,367 | 9/1974 | Dalerta | 123/124 R |
| 4,014,303 | 3/1977 | Aiti | 123/124 R |
| 4,037,406 | 7/1977 | Hartel | 123/124 R |
| 4,055,159 | 10/1977 | Cappiello | 123/124 R |
| 4,089,312 | 5/1978 | Ibbott | 123/119 D |
| 4,130,099 | 12/1978 | Ferguson | 123/119 D |
| 4,137,875 | 2/1979 | Medina | 123/119 D |

*Primary Examiner*—Wendell E. Burns
*Attorney, Agent, or Firm*—Wenderoth, Lind & Ponack

[57] ABSTRACT

In a device for introducing additional air into an air-fuel mixture flowing through an intake passage to combustion chambers of an internal combustion engine, means is provided for maintaining the pressure of the additional air or gas introduced into the intake passage from the periphery thereof to more than twice as high as the internal pressure in the intake passage.

9 Claims, 4 Drawing Figures

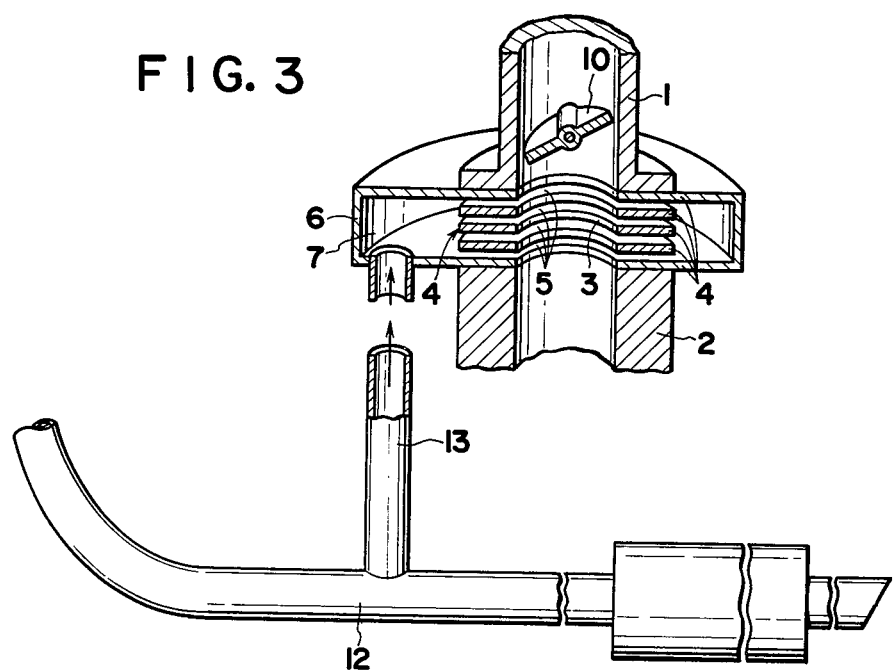
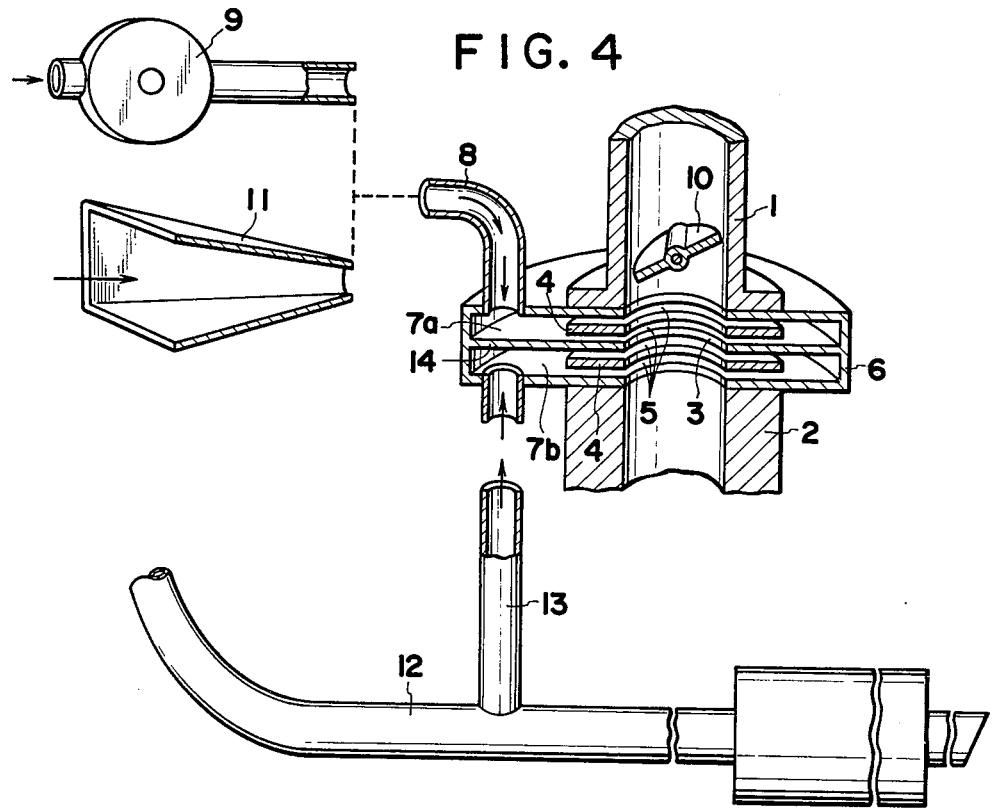

DEVICE FOR INTRODUCING ADDITIONAL AIR INTO INTAKE PASSAGE LEADING TO COMBUSTION CHAMBER

BACKGROUND OF THE INVENTION

This invention relates to a device for introducing additional air into an intake passage leading to a combustion chamber of an internal combustion engine and, more particularly, to an improvement of a device according to U.S. Pat. No. 4,089,312 issued to the present inventor.

During subsequent research and development of the device according to U.S. Pat. No. 4,089,312, it could be noted by the inventor that the advantages of the device are remarkable especially when the pressure in the intake passage is relatively low and that the amount of air introduced into the intake passage becomes a relatively large volume and almost constant below a certain level of vacuum in the intake passage.

According to the analyses of the present inventor of such effects, it could be assumed that when the pressure in the intake passage lowers to a certain level, the flow speed of additional air entering into the intake passage through very small peripheral openings or orifices in an intake manifold reaches a sonic speed. As is known, when the speed of air reaches the speed of sound, a so-called sonic barrier is formed to restrict any further increase of the speed of the air. Due to such sonic condition of the air flow, the flow speed of the additional air to be introduced into the intake passage is restricted from being further increased even when the pressure in the intake passage is decreased below the above certain level. The sonic condition of the air flow causes a microturbulence in the entering into the intake passage from the peripheral openings. The microturbulence in the air is generated only at the periphery of the intake passage defined by the peripheral openings but is activated so much that the fuel in the liquid state not vaporized and flowing down along the periphery of the intake passage is intimately mixed with the additional air entering from the peripheral openings of the intake passage and is effectively vaporized. The fuel mixed with the additional air and vaporized thereby is then led into combustion chambers for better combustion.

The remarkable advantages of the additional air flow could be noticed when the additional air flow reached the sonic condition due to a relatively low pressure in the intake passage, such as at times of engine idling and low speed driving of the engine. At the time when the pressure in the intake passage goes up beyond the above certain level due to relatively high speed driving of the engine, the sonic condition of the additional air flow is lost so that the amount of additional air flowing into the intake passage is decreased and also that the advantages of the microturbulence of the additional air are eliminated.

SUMMARY OF THE INVENTION

Accordingly, an object of the present invention is to provide a device which supplied a substantially constant amount of additional air into an intake passage of an internal combustion engine at any driving condition of the engine.

Another object of the present invention is to provide a device which causes a microturbulence in the additional air supplied into the intake passage for better mixing and combustion of fuel from the carburetor.

A further object of the present invention is to provide a device of the type set forth above wherein an exhausted gas is partially recirculated into the intake passage to reduce the amount of discharge of NOx into the atmosphere.

Still another object of the present invention is to provide a device of the type set forth above which can be conveniently installed in a car.

It could be noted by the present inventor that when a pressure at the external area of an intake passage becomes more than twice as high as a pressure at the internal area of the intake passage, an air or gas passing through a narrow opening between the external area and the internal area of the intake passage will have a sonic speed. For example, when the internal pressure of the intake passage has a value of about 7psi or less due to idling or low speed driving of the engine, the atmospheric pressure of about 14.7psi is more than twice as high as the internal pressure, so that the air or gas passing through the narrow opening will have a sonic speed to cause microturbulence at the periphery of the intake passage and that the amount of air or gas additionally supplied into the intake passage becomes substantially constant. This means that even if the pressure ratio of the external air pressure to the internal air pressure in the intake passage becomes more than 2:1, for example 3:1 or 4:1, due to lowering of the internal pressure, the amount of the air passing through the narrow opening is kept substantially constant by the sonic condition thereof.

On the other hand, when the engine speed goes up due to an increase of an opening of a throttle valve or a full throttle opening of the engine, the internal pressure in the intake passage also increases, so that the pressure ratio of the external atmospheric air pressure to the internal air pressure in the intake passage becomes less than 2:1 with the result that the flow speed of the additional air passing through the narrow opening is decreased to lose the sonic condition of the additional air.

According to the present invention, means is provided for maintaining the external pressure of the additional air or gas passing through the narrow opening into the intake passage to be more than twice as high as the internal pressure in the intake passage. With the provision of such means, the air or gas passing through the narrow opening will have a sonic flow speed at any driving condition of the engine, so that a sonic condition is obtained in the additional air or gas to cause a microturbulence at the periphery of the intake passage for better mixing of the fuel with air or gas and for better combustion thereof.

The means for maintaining the external pressure of the additional air or gas to be more than twice as high as the internal pressure in the intake passage may be an air pump which is connected to the narrow opening at the periphery of the intake passage and which supplies atmospheric air to the narrow opening under pressure. Alternatively, the same means may be an air collecting hollow member, such as a scoop gradually becoming wider toward the open end thereof, which is connected at one end portion thereof to the narrow opening at the peripheral portion of the intake passage and opened at the other end portion thereof in the same direction as the car travel. In still another modification, the above same means may be a pipe which is connected at one end thereof to the narrow opening at the peripheral portion of the intake passage and at the other end thereof to an exhaust pipe.

Preferably, the narrow opening is a slot-shaped opening at the periphery of the intake passage with a gap of less than 0.35 mm. More preferably, a plurality of the narrow slot-shaped openings are formed at the periphery of the intake passage by stacking plates with spacers of a thickness of less than 0.35 mm between each of the plates.

Other objects and features of the present invention will become apparent from the following detailed description of preferred embodiments thereof when taken in conjunction with the accompanying drawings, in which:

BRIEF DESCRIPTION OF THE DRAWINGS

FIG. 3 is a partially sectioned vertical perspective view showing a device according to a third embodiment of the present invention, and FIG. 4 is a partially sectioned vertical perspective view showing a device according to a fourth embodiment of the present invention.

DETAILED DESCRIPTION OF THE INVENTION

The present invention will now be described in detail with reference to the accompanying drawings showing preferred embodiments of the invention.

Figure 1:
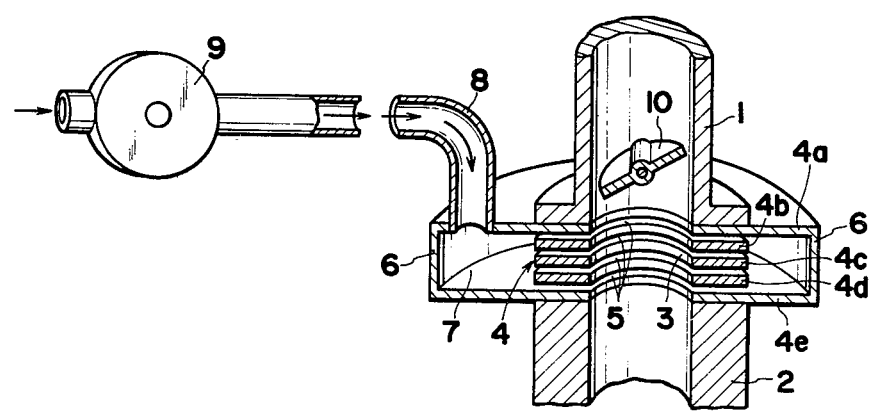
FIG. 1 is a partially sectioned vertical perspective view showing a device according to a first embodiment of the present invention.

Referring to a first embodiment shown in FIG. 1, the device of the invention includes a multiple orifice unit comprising a plurality of annular-shaped plates 4 stacked in layers with spacer members (not shown) between each pair of adjacent plates 4 to form slot-shaped openings or orifices 5 of the same gap size between each adjacent pair of annular plates 4. Preferably, it could be noted that such gap between each pair of annular plates should be less than 0.35 mm and, more preferably, approximately 0.25 mm or less. Bores in each annular plate 4 are registered or aligned with each other to form a vertical circular passage 3, when the plates are stacked as shown.

With the arrangement set forth above, when the multiple orifice unit is installed between a carburetor 1 and an intake manifold 2, the registered bores or the vertical circular passage 3 forms a part of an intake passage which is communicated with an external atmosphere through the slot-shaped openings or orifices 5 between the stacked plates 4. It should be noted here that the vertical circular passage 3 in the multiple orifice unit should be not larger than the adjoining upper intake passage leading to the carburetor and the lower intake passage leading to the intake manifold.

The essential features of the multiple orifice unit have been disclosed in the invention according to U.S. Pat. No. 4,089,312, by the applicant of the present invention. However, different from the multiple orifice unit shown in such patent, in the preferred embodiment of the present invention, the uppermost annular plate 4a as well as the lowermost annular plate 4e are made with an outer periphery larger than that of the other intermediate annular plates 4b–4d, inclusive. After registration of the bores of the annular plates 4a–4e, a space formed by the peripheries of both the uppermost and lowermost annular plates 4a and 4e is covered with a side plate 6 to form an annular space 7 communicating with the outer peripheral portions of the slot orifices 5. The uppermost annular plate 4a is provided with a hole at a vicinity of the periphery thereof to which a connecting pipe 8 is connected at one end thereof. The connecting pipe 8 is provided with an air pump 9 and is opened to the atmosphere at the other end thereof. The air pump 9 serves to supply atmospheric air under a relatively high pressure into the annular space 7, from which the pressurized air is additionally supplied into the intake passage through the slot-shaped orifices 5. Preferably, the air pump 9 is a pump that can increase the pressure in the annular space 7 to approximately 30 psi which is approximately twice as high as atmospheric pressure (14.7 psi).

As described above, in the device according to the first embodiment of the present invention, the pressure of the air in the annular space 7 formed around the multiple slot orifices 5 is maintained at a high pressure, for example, approximately 28 psi. Accordingly, even when the internal pressure in the intake passage 3 is increased to 14 psi, i.e., substantially equal to atmospheric pressure, at a high engine speed for which a butterfly throttle value 10 of the carburetor 1 is sufficiently opened, the external high pressure in the annular space 7 is more than twice as high as the internal low pressure. As a result, the air stream flowing into the intake passage 3 through the multiple slot orifices 5 attains a condition of sonic flow. In this condition, a constant amount of additional air is supplied to the intake passage 3.

On the other hand, during idling of the engine where butterfly throttle value 10 of the carburetor 1 is closed, or at low as well as intermediate engine speeds where the throttle butterfly 10 is partially closed, the internal pressure in the intake passage 3 decreases and the external pressure having been raised to approximately 28 psi becomes much more than twice as high as the internal pressure. However, the acceleration of the air stream flowing into the intake passage 3 through narrow slot orifices 5 is prevented by the sonic flow condition mentioned above so that a constant amount of additional air is supplied into the intake passage 3 at a flow rate equal to that of the case where the external pressure is almost twice as high as the internal pressure in the intake passage 3. In the sonic flow condition, microturbulence is created or generated at the inner periphery of the slot-shaped orifices 5, i.e. at the periphery of the intake passage 3 defined by the stacked plates 4. This microturbulence of the additional air introduced into the intake passage lasts for a short while after leaving the inner peripheral open ends of the slot-shaped orifices but does not interfere with a smooth flow of the mixture of air and fuel led into the intake passage from the carburetor. Also, the microturbulence of the additional air in the intake passage is so activated that liquid fuel not vaporized in the carburetor and flowing into the intake passage along the vicinity of the periphery thereof is well mixed with the activated additional air by the microturbulence and is vaporized, thereby resulting in better combustion of the air-fuel mixture.

Figure 2:
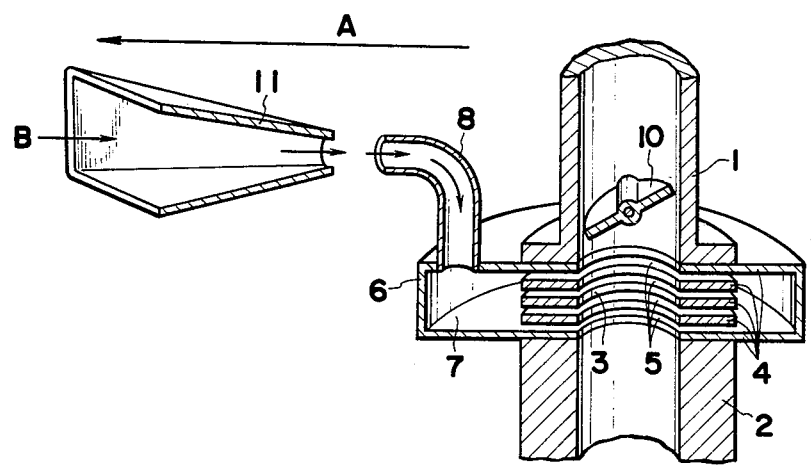
FIG. 2 is a partially sectioned vertical perspective view showing a device according to a second embodiment of the present invention.

A second embodiment of the present invention shown in FIG. 2 is substantially the same as in the first embodiment shown in FIG. 1 except that the air pump of FIG. 1 is replaced with an air scoop 11. The funnel-shaped air scoop 11 is connected to an extreme end of the connecting pipe 8. Arrow A shows the direction of car travel, and when the car moves in the direction A, air in the direction B is packed into the air scoop and is compressed, whereby the pressure in the annular space 7 formed around the multiple slot orifices 5 is raised. The rise or increase of the pressure in the annular space 7 is in proportion to the travelling speed of the car, that is, the speed of revolution of the engine. In this connection, the shape and dimensions of the air scoop 11 are determined in order that the pressure mentioned above can be more than twice as high as the internal pressure in the intake passage 3 at any car travelling condition. In this arrangement, the air stream flowing into the intake passage 3 through the multiple slot orifices 5 can be maintained in the sonic flow condition at low, intermediate, or high engine speed so that a constant amount of additional air can be supplied into the intake passage 3 as in the case of the first embodiment.

In the case of idling of the engine where the car does not travel, since the internal pressure in the intake passage 3 is less than ½ of the atmospheric pressure, the air stream flowing into the intake passage 3 through the multiple slot orifices 5 can be maintained in the sonic flow condition as in the case where the car is travelling as mentioned above.

Thus, the air scoop 11 having a very simple structure can be adopted in the second embodiment of the present invention to provide the external pressure which is more than twice as high as the internal pressure in the intake passage at any engine speed, that is, from idling of the engine to a high engine speed. In this arrangement, the air stream flowing into the intake passage 3 through the multiple slot orifices 5 as in the first embodiment is under a sonic flow condition so that a constant amount of the additional air is supplied into the intake passage 3 and more complete combustion of the air-fuel mixture can be carried out.

In a third embodiment of the present invention shown in FIG. 3, in place of the supply of atmospheric air into the intake passage 3 between the carburetor 1 and the intake manifold 2, a part of an exhaust gas is recirculated into the intake passage. That is, the annular space 7 formed around the multiple slot orifices 5 is connected to an exhaust pipe 12 through a branch pipe 13 to recirculate a part of the exhaust gas into the annular space 7. In case of idling of the engine, the internal pressure in the intake passage 3 is less than ½ with respect to atmospheric pressure, while the pressure in the exhaust pipe 12 is substantially equal to atmospheric pressure. Accordingly, the pressure in the annular space 7 communicating with the exhaust pipe 12 through the branch pipe 13 becomes more than twice as high as the pressure in the intake passage 3 so that the exhaust gas stream flowing into the intake passage 3 via the branch pipe 13 and the multiple slot orifices 5 is at the sonic flow condition, whereby a constant amount of the exhaust gas is recirculated into the intake passage 3 and a microturbulence is generated in the recirculated exhaust gas for better mixing with the fuel.

On the other hand, in the cases when the car is travelling, although the internal pressure in the intake passage 3 increases, a back pressure, that is, the pressure of the exhaust gas supplied from the exhaust pipe 12 to the annular space 7 via the branch pipe 13 also rises proportionally to the increase of the internal pressure so that the external pressure in the annular space 7 is maintained more than twice as high as the internal pressure in the intake passage. Therefore, at any engine speed, the exhaust gas stream flowing into the intake passage 3 through the multiple slot orifices 5 maintains the sonic flow condition, whereby the constant amount of exhaust gas is recirculated to the intake passage and also a microturbulence is generated in the recirculated exhaust gas.

A recirculating system of exhaust gas in which the exhaust gas is fed back to the engine combustion chamber is well known. In this known system, the exhaust gas is generally fed into an air intake port positioned upstream of the carburetor, while in this embodiment of the present invention a constant amount of the exhaust is fed back to the intake passage 3 positioned downstream of the carburetor through the multiple slot orifices 5 by the sonic flow condition. Thus, the system according to the present embodiment has advantages such as enhanced atomization of the liquid fuel, intimate air-fuel mixing, favourable mixing of the recirculated exhaust gas with the air and fuel, and fast combustion of the fuel brought about by the microturbulence created at the periphery of the intake passage 3 as well as advantages such as reduction of NOx attained by the exhaust gas recirculation system.

Referring to a fourth embodiment of the present invention shown in FIG. 4, it comprises one device described in the first or second embodiments of the present invention in which a constant amount of atmospheric air can be supplied into the intake passage 3, and other device described in the third embodiment in which a constant amount of the exhaust gas can be fed back to the intake passage 3. In the fourth embodiment, the annular space 7 formed around the outer periphery of the multiple slot orifices 5 is divided into two sections, that is, upper and lower annular spaces 7a and 7b, by an annular partition 14. The upper annular space 7a is communicated with an air pump 9 or an air scoop 11 by a connecting pipe 8 and the lower annular space 7b is communicated to an exhaust pipe 12 by a branch pipe 13.

In this fourth embodiment, such remarkable functions and advantages as mentioned hereinbelow can be obtained. That is, according to the same principle as described in the first, second, and third embodiments of the invention, the external pressure in the annular spaces 7a and 7b is maintained more than twice as high as the internal pressure in the intake passage, and as a result, the air and the exhaust gas flowing into the intake passage 3 through the multiple slot orifices 5 reach the speed of sound, i.e., the condition of sonic flow, whereby the constant amount of the air as well as of the exhaust gas is supplied and fed into the intake passage. In addition, the mixing condition of the air-fuel stream is much improved by the additional air supplied, thereby greatly reducing the emission of carbon monoxide CO and hydrocarbon HC. Also, the recirculation of the exhaust gas lowers the burning temperature in the combustion chamber with the noticeable reduction of NOx.

Although it has been described in the embodiments set forth above that the slot-shaped orifices 5 are formed by stacking a plurality of annular plates 4 in layers with the same size space between each adjacent pair of annular plates, other small or narrow openings may be provided for communicating the interior of the intake passage with the exterior atmosphere. For example, a cylindrical hollow body may be used, the peripheral wall of which defines an axial opening therein for forming a part of the intake passage and the periphery of which has a series of small openings for communicating the intake passage with the atmosphere. However, the embodiments in which the multiple slot orifices 5 are formed with annular plates 4 are effective for affording the sonic flow condition of the present invention, because the external air or gas flowing into the intake passage through the orifices is increasingly compressed to have a higher pressure during the transfer thereof from the outer periphery to the inner periphery of the annular plates so that a more effective difference between the internal and external pressures can be obtained at the inside and outside of the intake passage.

The sonic flow condition described in the present invention occurs in the case where the internal pressure in the intake passage 3 is less than ½ with respect to the external pressure. Accordingly, if a relatively wide opening or openings are made through the periphery of the intake passage, a relatively big pump will be required to cause the sonic flow condition in the air or gas passing through the openings. However, the size or dimensions of the openings are determined by the sizes of the different engines, each of which will have the optimum engine condition by a predetermined amount of additional air or gas introduced into the intake passage. It is preferable to make very small openings which are not limited to slot-shaped openings but the total area of which allows the predetermined optimum amount of air or gas to be introduced into the intake passage. With such small openings, it becomes possible to use a relatively small pump or scoop to generate the sonic flow condition in the additional air or gas. In the case of forming slot-shaped orifices or openings by stacking plates with spacers therebetween, it has been noted that each opening between the adjacent upper and lower plates is preferably less than 0.35 mm for use with a small air pump or scoop.

Although the present invention has been described with reference to the preferred embodiments thereof, many modifications and alterations may be made within the spirit of the present invention.

What is claimed is:

1. A device for introducing additional air into an air-fuel mixture flowing through an intake passage from a fuel feeding apparatus to combustion chambers of an internal combustion engine of a vehicle, said device comprising:

a member adapted to be mounted between the fuel feeding means and the combustion chambers of an internal combustion engine;

said member having an opening forming a portion of an intake passage for leading an air-fuel mixture to the combustion chambers when said member is so mounted;

space means, extending through said member from the exterior thereof to said opening and arranged peripherally of said opening, for, when said member is so mounted, allowing additional gas to be introduced through said space means into the air-fuel mixture in said intake passage; and means for maintaining, at all operating speeds and conditions of the engine, the pressure of said additional gas at said exterior of said member at a level approximately at least twice as high as the internal pressure within said intake passage, and for thereby maintaining a pressure ratio across said space means of approximately at least 2:1.

2. A device as claimed in claim 1, wherein said pressure maintaining means comprises an air pump for feeding atmospheric air into said intake passage through said space means at a pressure about two times higher than said internal pressure within said intake passage.

3. A device as claimed in claim 2, wherein said pressure maintaining means further comprises a pipe connecting said space means to an exhaust pipe of the internal combustion engine.

4. A device as claimed in claim 1, wherein said pressure maintaining means comprises a hollow body opened in the direction of travel of the vehicle, said hollow body being connected to said space means, said hollow body having dimensions for feeding atmospheric air into said intake passage through said space means at a pressure about two times higher than said internal pressure within said intake passage when the vehicle equipped therewith travels at a full throttle open condition.

5. A device as claimed in claim 4, wherein said pressure maintaining means further comprises a pipe connecting said space means to an exhaust pipe of the internal combustion engine.

6. A device as claimed in claim 4, wherein said hollow body comprises a scoop which becomes wider toward the open end thereof.

7. A device as claimed in claim 1, wherein said pressure maintaining means comprises a pipe connecting said space means to an exhaust pipe of the internal combustion engine.

8. A device as claimed in claim 1, wherein said space means comprises slots formed by stacking a plurality of plates with a spacer between each adjacent pair of plates, outer peripheral portions of said slots being enclosed by a closed space to which said pressure maintaining means is connected.

9. A device as claimed in claim 8, wherein each of said slots has a gap of less than 0.35 mm.

* * * * *